US012705037B1

(12) United States Patent
Kabak

(10) Patent No.: US 12,705,037 B1
(45) Date of Patent: Aug. 11, 2026

(54) SYSTEMS AND METHODS FOR DEPLOYMENTS OF MACHINE LEARNING MODELS FOR MULTIPLE SOFTWARE FRAMEWORKS, HARDWARE TARGETS, PARALLELIZATION AND DISTRIBUTION MODES

(71) Applicant: Synnada, Inc., Austin, TX (US)

(72) Inventor: Mehmet Ozan Kabak, Lago Vista, TX (US)

(73) Assignee: Synnada, Inc., Austin, TX (US)

( * ) Notice: Subject to any disclaimer, the term of this patent is extended or adjusted under 35 U.S.C. 154(b) by 0 days.

(21) Appl. No.: 19/257,263

(22) Filed: Jul. 1, 2025

(51) Int. Cl.
*G06F 8/60* (2018.01)
*G06F 8/30* (2018.01)
*G06F 8/41* (2018.01)

(52) U.S. Cl.
CPC .................. *G06F 8/60* (2013.01); *G06F 8/30* (2013.01); *G06F 8/443* (2013.01)

(58) Field of Classification Search
CPC ............... G06F 8/60; G06F 8/30; G06F 8/443
See application file for complete search history.

(56) References Cited

U.S. PATENT DOCUMENTS 10,614,375 B2 4/2020 Duggan
11,301,762 B1 4/2022 Chen
12,443,399 B1 * 10/2025 Hanebutte ........... G06F 11/3452
2020/0242000 A1 * 7/2020 Khosrowpour ..... G06F 11/3608
2022/0129766 A1 * 4/2022 Potts ...................... G16H 70/60
2022/0300812 A1 * 9/2022 Yeleshwarapu .......... G06N 3/09
2023/0049611 A1 * 2/2023 Murthy ..................... G06F 8/65
2023/0121044 A1 * 4/2023 Grover ...................... G06F 8/30 706/25
2023/0161554 A1 * 5/2023 Xi .......................... G06F 7/483 708/502
2023/0267373 A1 8/2023 Ravi
2023/0289616 A1 * 9/2023 Liu ........................ G06N 3/098
2023/0368077 A1 * 11/2023 Yao ........................ G06N 20/00
2024/0176606 A1 * 5/2024 Agarwal ............. G06F 11/3688
2024/0412094 A1 * 12/2024 Roncancio ............. G06N 20/00
2025/0088201 A1 * 3/2025 Przybylski .......... G06F 11/2038
2025/0148472 A1 * 5/2025 Ur ...................... G06Q 30/0225
2025/0165818 A1 5/2025 Dubey
2025/0232185 A1 7/2025 Rapp (Continued)

OTHER PUBLICATIONS

Wang, Xiaoda, et al. "Couler: Unified Machine Learning Workflow Optimization in Cloud." 2024 IEEE 40th International Conference on Data Engineering (ICDE). IEEE, 2024. (Year: 2024).*

(Continued)

*Primary Examiner* — Bradley A Teets
*Assistant Examiner* — Joanne G Macasiano
(74) *Attorney, Agent, or Firm* — Esplin & Associates, PC

(57) ABSTRACT

Systems and methods for deploying individual machine learning models for multiple deployment targets are disclosed. Exemplary implementations may: obtain a logical representation of a machine learning model; obtain information regarding multiple deployment targets; generate a directed acyclic graph (DAG); perform logical and physical optimizations; generate different sets of target code for the multiple deployment targets; deploy the different sets of target code, and/or perform other steps.

19 Claims, 3 Drawing Sheets

(56) References Cited

U.S. PATENT DOCUMENTS

| | | | | |
|---|---|---|---|---|
| 2025/0240220 | A1* | 7/2025 | Poothiyot ............. | G06F 9/5027 |
| 2025/0335818 | A1 | 10/2025 | Maurice | |

OTHER PUBLICATIONS

Castro-Lopez, Oscar, and Ines F. Vega-Lopez. "Multi-target compiler for the deployment of machine learning models." 2019 IEEE/ACM International Symposium on Code Generation and Optimization (CGO). IEEE, 2019. (Year: 2019).*

* cited by examiner

SYSTEMS AND METHODS FOR DEPLOYMENTS OF MACHINE LEARNING MODELS FOR MULTIPLE SOFTWARE FRAMEWORKS, HARDWARE TARGETS, PARALLELIZATION AND DISTRIBUTION MODES

FIELD OF THE DISCLOSURE

The present disclosure relates to systems and methods for deploying individual machine learning models for multiple software frameworks, hardware targets, parallelization and distribution modes.

BACKGROUND

Deploying a particular machine learning model for a particular (software) framework is known. Certain optimizations of a logical representation of a machine learning model are known.

SUMMARY

One aspect of the present disclosure relates to a system configured to deploy an individual machine learning model for multiple deployment targets. The system may be configured to obtain a logical representation of a machine learning model. The system may be configured to obtain information regarding multiple deployment targets. The system may be configured to generate a directed acyclic graph (DAG) that corresponds to the logical representation. The system may be configured to perform logical and physical optimizations. The system may be configured to generate different sets of target code for the multiple deployment targets. The system may be configured to deploy the different sets of target code, and/or perform other steps. As used herein, the phrase "configured to" is intended to be interpreted broadly, as "being capable of or suitable for performing" some function or feature, without requiring any adaptations to provide said function or feature.

Another aspect of the present disclosure relates to a method of deploying individual machine learning models for multiple deployment targets. The method may include obtaining a logical representation of a machine learning model. The method may include obtaining information regarding multiple deployment targets. The method may include generating a directed acyclic graph (DAG) that corresponds to the logical representation. The method may include performing logical and physical optimizations. The method may include generating different sets of target code for the multiple deployment targets. The method may include deploying the different sets of target code, and/or performing other steps.

As used herein, any association (or relation, or reflection, or indication, or correspondency) involving machine learning models, deployment targets, representations, parameters, modes of use, deployments, graphs, optimizations, sets of target code, performance metrics, latencies, servers, processors, architectures, devices, nodes, computing platforms, electronic files, formats, user interfaces, user interface elements, queries, tasks, replies, prompts, operations, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, receipt, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
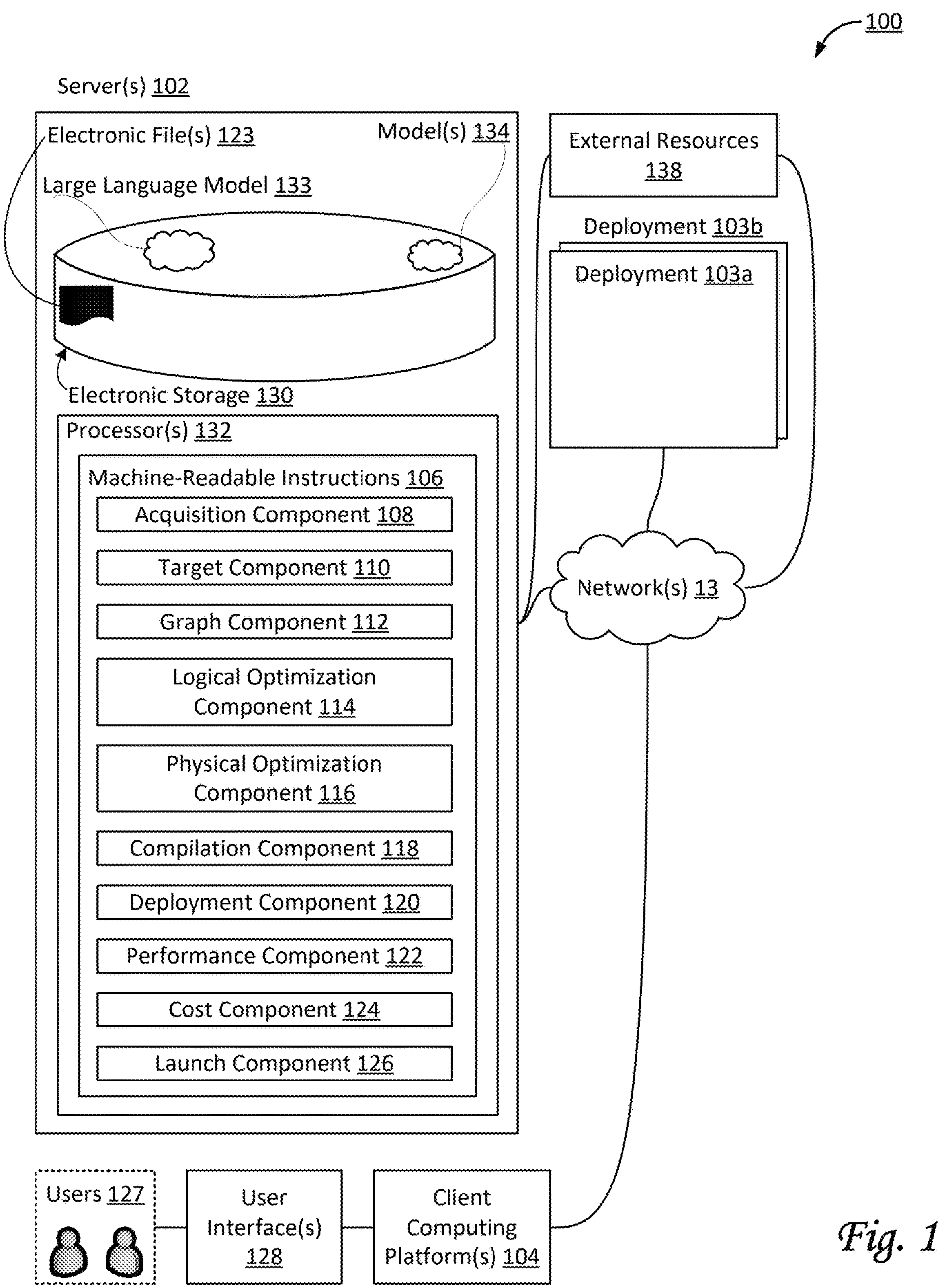
FIG. 1 illustrates a system configured to deploy individual machine learning models for multiple deployment targets, in accordance with one or more implementations.

FIG. 1 illustrates a system 100 configured to deploy individual machine learning models for multiple software frameworks, hardware targets, parallelization and distribution modes, in accordance with one or more implementations. A particular combination of a software framework, a hardware target, a parallelization mode, a distribution mode, and/or any other deployment-specific characteristics may be referred to as a deployment target. System 100 may be configured to deploy a particular machine learning model for multiple deployment targets. By way of non-limiting example, a particular hardware target may include and/or define a particular hardware architecture and/or instruction set architecture. By way of non-limiting example, a particular software framework may include JAX, or MLX, and/or another software framework.

Operations by system 100 may use one or more models 134 (which may include one or more machine learning models such as a large language model 133) to process, analyze, and/or operate on information (e.g., system input may include user input, a set of one or more (electronic) files 123, and/or other input).

In some implementations, system 100 may include server (s) 102, one or more client computing platforms 104, one or more user interfaces 128, external resources 138, a large language model 133, one or more other models 134, and/or other components. System 100 and/or server 102 may be configured to communicate with one or more client computing platforms 104 according to a client/server architecture and/or other architectures. Client computing platform(s) 104 may be configured to communicate with other client computing platforms via server 102 and/or according to a peer-to-peer architecture and/or other architectures. Users 127 may access system 100 via client computing platform(s) 104. In some implementations, individual user interfaces 128 may be associated with individual client computing platforms 104.

Server 102 may be configured by machine-readable instructions 106. Machine-readable instructions 106 may include one or more instruction components. The instruction components may include computer program components. The instruction components may include one or more of an acquisition component 108, a target component 110, a graph component 112, a logical optimization component 114, a physical optimization component 116, a compilation component 118, a deployment component 120, a performance component 122, a cost component 124, a launch component 126, and/or other instruction components. Some components may be configured to obtain and/or retrieve electronic files, including but not limited to electronic files 123.

Acquisition component 108 may be configured to obtain, retrieve, and/or otherwise receive information, including but not limited to logical representations of particular machine learning models, sets of parameters for the logical representations of the particular machine learning models, modes of use for deployments of the particular machine learning models, and/or other information. In some implementations, the sets of parameters for the logical representations of the particular machine learning models may include a set of deployment-agnostic parameters for a particular logical representation of a particular machine learning model 134. As used herein, deployment-agnostic parameters are parameters that are independent of a particular deployment, and/or independent of the particular deployment (including but not limited to a particular hardware architecture) used for a given machine learning model. For example, the number of dimensions or the number of layers of a neural network may be deployment-agnostic parameters.

In some implementations, acquisition component 108 may obtain a logical representation of machine learning model 134 through an electronic file 123, e.g., provided by user 127. For example, electronic file 123 may be stored in electronic storage 130. In some cases, a logical representation of machine learning model 134 may be described in PYTHON™ via a domain-specific language (DSL). In some implementations, acquisition component 108 may obtain a set of deployment-agnostic parameters for a logical representation of machine learning model 134 through user input from user 127, e.g., through a user interface 128. In some implementations, acquisition component 108 may obtain a mode of use for one or more deployments of machine learning model 134 through user input from user 127, e.g., through a user interface 128. For example, the mode of use may be a training mode of use, a fine-tuning mode of use, and/or an inference mode of use.

Target component 110 may be configured to obtain information regarding multiple deployment targets for multiple deployments of a single machine learning model 134. Target component 110 may receive such information from user 127, e.g., through one or more electronic files 123. In some implementations, the multiple deployment targets include a first deployment target and a second deployment target. In some implementations, the multiple deployment targets include more than two deployment targets, e.g., a first deployment target, a second deployment target, and a third deployment target. In some implementations, the first deployment target for a first deployment **103*a* of machine learning model 134 includes one or more parallelization parameters and/or one or more distribution parameters. In some implementations, the second deployment target for a second deployment 103*b* of machine learning model 134** includes one or more parallelization parameters and/or one or more distribution parameters, and so forth.

As used herein, the information about a particular deployment target describes not only the particular hardware architecture and instruction set architecture (e.g., Intel-x86, ARM, NV-H100, Google-TPU, etc.) but also the particular software framework (e.g., JAX, MLX, TensorFlow, PyTorch, Keras, etc.). In some implementations, the information about a particular deployment target may describe the way a task or program for the particular deployment is launched (e.g., on-prem, or through a cloud-based platform such as AWS, GCP, Microsoft-Azure, IBM-Cloud, Nvidia DGX, Nvidia NIM, etc.). These examples are merely illustrative, and not intended to be limiting.

Graph component 112 may be configured to generate computational graphs for machine learning models. For example, graph component 112 may generate a hierarchical directed acyclic graph (DAG) that corresponds to a particular logical representation of machine learning model 134. In some implementations, generation of a hierarchical DAG may be based on a set of deployment-agnostic parameters (e.g., as obtained by acquisition component 108), a mode of use of the multiple deployments (e.g., as obtained by acquisition component 108), and/or other information.

Logical optimization component 114 may be configured to perform logical optimizations on computational graphs. For example, logical optimization component 114 may perform one or more logical optimizations on the hierarchical DAG (e.g., as obtained from graph component 112, and corresponding to the logical representation of machine learning model 134) to create a modified DAG. In some implementations, the one or more logical optimizations performed by logical optimization component 114 may be agnostic and/or independent with respect to the multiple deployment targets for machine learning model 134. In some implementations, logical optimizations may include one or more of adjusting floating point precisions (for particular computational (sub) graphs), pruning one or more computational paths in the modified DAG by virtue of unused inputs and/or unused operations, simplifying the modified DAG based on one or more ranges of one or more input values, detecting one or more duplicate computations and reducing the modified DAG by removing the one or more duplicate computations, and/or other logical optimizations. For example, user 127 may provide use-case specific knowledge, e.g., regarding an efficient implementation of gradient calculation.

Physical optimization component 116 may be configured to perform physical optimizations on computational graphs. For example, physical optimization component 116 may perform one or more physical optimizations on the modified DAG (e.g., as obtained from logical optimization component 114). Physical optimizations may be based on (characteristics of) the multiple deployment targets for the deployments of machine learning model 134. In some implementations, a particular physical optimization may be a universal optimization that is agnostic with respect to a particular deployment target. For example, a universal physical optimization may be based on pruning one or more computational paths in the modified DAG by virtue of static values in the modified DAG. Some physical optimizations may be target-specific optimizations that are based on information regarding specific deployment targets. For example, a first target-specific physical optimization may be available specifically for a tensor processing unit (TPU) architecture by GOOGLE™, a second target-specific physical optimization may be available specifically for an architecture based on graphical processing units (GPUs) by NVIDIA™, a third target-specific physical optimization may be available specifically for an XDNA™ architecture or an CDNA™ architecture by AMD™, and so forth. By way of non-limiting example, a first deployment target may use an architecture based on graphical processing units (GPUs) by NVIDIA™ and a second deployment target may use at least one of a tensor processing unit (TPU) architecture by GOOGLE™, a NeuronCore™ architecture by AWS™, an XDNA™ architecture or an CDNA™ architecture by AMD™, a neural processing unit (NPU) architecture by INTEL™, and/or an AZURE AI architecture by MICROSOFT™ such as AZURE MAIA 100™. Certain optimizations may include vendor-specific optimizations that are based on the specific software framework that is used. For example, the combination of JAX with TPUs, or of MLX for Apple silicon may enable certain optimizations.

In some implementations, graph component 114 may be configured to compile and/or flatten computational graphs. For example, graph component 114 may flatten a modified DAG (e.g., after logical and/or physical optimizations) into a flattened DAG. As used herein, flattening means that at least some of the hierarchy in a computational graph has been reduced and/or removed, but not necessarily that zero hierarchy remains. In some implementations, a flattened DAG may correspond to a representation of machine learning model 134 that includes and/or characterizes one or more data types, memory layout, and/or tensor shapes.

In some implementations, the information regarding multiple deployment targets for the deployments of machine learning model 134 may include parallelization parameters that describe a specific number of physical computational devices (or cores in a multi-core device, or GPUs in a multi-GPU system) available in at least one of the multiple deployment targets to execute simultaneously on different parts of a particular task. In some implementations, optimizing a hierarchical DAG through logical optimizations and physical optimizations may include parallelizing computation across a specific number of physical computational devices (or cores, or GPUs), e.g., based on tensor calculation times and inter-device communication latencies between the specific number of physical computational devices (or cores, or GPUs). In some implementations, the parallelization parameters (for a single machine learning model 134) may be the same for multiple deployment targets.

In some implementations, the information regarding multiple deployment targets for the deployments of machine learning model 134 may include distribution parameters that describe and/or embody a strategy (e.g., including a mesh specification) for sharding tensors across multiple devices and/or nodes, working together over a network. For example, in some cases, for fine-tuning and training, datasets may be so large that sharding across multiple devices and/or nodes is necessary. As another example, in some cases, the particular machine learning model is so large that their weights/parameters alone do not fit the available memory on a single device or node, in which case sharding tensors may become necessary to run inference. In some implementations, the distribution parameters (for a single machine learning model 134) may be the same for multiple deployment targets.

In some implementations, system 100 may be configured to determine one or more data structures that encode one or more dependencies of at least one of a hierarchical DAG of machine learning model 134, a modified DAG of machine learning model 134, and/or a flattened DAG of machine learning model 134. In some cases, at least one of the one or more logical optimizations and the one or more physical optimizations may be based on using the one or more data structures that have been determined. In some implementations, users can provide sub-graph patterns that are associated with certain optimizations. System 100 may be configured to recognize recurring sub-graphs and be optimized to compile such patterns only once.

Compilation component 118 may be configured to generate sets of target code that are executable on particular (hardware) targets. For example, compilation component 118 may generate a first set of target code that is executable on a first hardware target as a first deployment of machine learning model 134. For example, compilation component 118 may generate a second set of target code that is executable on a second hardware target as a second deployment of machine learning model 134, and so forth. The first hardware target may be different from the second hardware target. The first deployment is different from the second deployment. Code generation by compilation component 118 may be based on a computational graph such as, e.g., a flattened DAG (e.g., as obtained from graph component 114). Code generation by compilation component 118 may be based on a computational graph that has been optimized through one or more logical optimizations and/or one or more physical optimizations.

In some implementations, compilation component 118 may generate a particular set of target code based on one or more of minimizing peak memory usage, maximizing core utilization, and/or optimizing memory performance. A selection of one or more of these goals may be made in accordance with the mode of use for the multiple deployments of machine learning model 134. For example, for large models, a goal of minimizing peak memory usage may be typical. For example, for vision models, a goal of maximizing core utilization may be typical. For example, for language models, a goal of optimizing memory performance may be typical.

In some implementations, compilation component 118 may generate a particular set of target code that includes SystemVerilog code. A corresponding deployment may implement the generated SystemVerilog code on a field programmable gate array (FPGA) device or platform, thereby turning machine learning model 134 in hardware. In some cases, compilation component 118 may generate high-level code (e.g., Python) or low-level code (e.g., C, Rust, etc.) as needed.

Deployment component 120 may be configured to deploy sets of (generated) code as particular deployments on machine learning models. For example, deployment component 120 may deploy a first set of target code as the first deployment of machine learning model 134. For example, deployment component 120 may deploy a second set of target code as the second deployment of machine learning model 134, and so forth. In some cases, the first deployment target and the second deployment target may use different hardware architectures and different instruction set architectures. In some implementations, deploying (generated) code may include packaging, transferring, installing, and/or hosting code to certain systems and/or platforms, including but not limited to library code needed by generated code. In some cases, a deployment can be hosted by a centralized provider (i.e., a third party from the point of view of the user running tasks on the deployed machine learning model). In other cases, a deployment can be hosted by the customer/client, e.g., using on-prem infrastructure, or client-owned cloud infrastructure.

Performance component 122 may be configured to determine sets of performance metrics associated with execution of sets of target code for deployments of machine learning models. For example, a particular set of performance metrics may include a range of latencies associated with execution of a particular set of target code for a particular deployment of a machine learning model. For example, a particular set of performance metrics may include a peak memory usage associated with execution of a particular set of target code for a particular deployment of a machine learning model. For example, a particular set of performance metrics may include another aspect of (memory) performance (for example, core saturation), and/or a metric based on one or more of the goals used by compilation component 118 during code generation. In some implementations, performance component 122 may determine performance profiles associated with execution of sets of target code for deployments of machine learning models. For example, a particular performance profile may include at least two different performance metrics associated with execution of a particular set of target code for a particular deployment of a machine learning model. For example, a particular performance profile may include a combination of a range of latencies and a peak memory usage. As another example, performance component 122 may determine a first range of latencies associated with execution of a first set of target code for a first deployment of machine learning model 134. For example, performance component 122 may determine a second range of latencies associated with execution of a second set of target code for a second deployment of machine learning model 134, and so forth.

Cost component 124 may be configured to determine costs associated with execution of sets of target code for deployments of particular machine learning models. For example, cost component may determine a first cost associated with execution of a first set of target code for a first deployment of machine learning model 134. For example, cost component may determine a second cost associated with execution of a second set of target code for a second deployment of machine learning model 134, and so forth. In some implementations, cost may be determined as an amount of power used, or expected to be used. In some implementations, cost may be determined based on fees related to the use of (compute/storage) services, including but not limited to rental fees, usage fees, license fees, management fees, fees related to the cost of ownership, and/or other fees. In some implementations, cost may be determined in a way that accounts for both energy and services.

Launch component 126 may be configured to receive and/or obtain requests for execution of tasks on machine learning models. In particular, launch component 126 may obtain, from a user, a request for the execution of a particular task on machine learning model 134. Launch component 126 may be configured to receive and/or obtain selections for a particular deployment, selected from multiple available deployments of a particular machine learning model. In particular, launch component 126 may obtain, from a user, a selection for either a first deployment or a second deployment of machine learning model 134 for the execution of a particular task. Launch component 126 may be configured to launch tasks for execution on selected deployments of a particular machine learning model. In particular, launch component 126 may launch the particular task on either the first deployment or the second deployment of machine learning model 134, in accordance with the selection by the user. By way of non-limiting example, launching tasks may include generating and providing prompts (and/or contextual information for those prompts) to machine learning model 134. In some implementations, launch component may receive user input from a user through user interface 128. In some implementations, information from machine learning model 134 (e.g., a response or reply) may be presented to a user through user interface 128.

In some implementations, large language model 133 has been trained on at least a million electronic files. In some implementations, large language model 133 has been trained on at least 100 million electronic files. In some implementations, large language model 133 may include and/or be based on a neural network using over a billion parameters and/or weights. In some implementations, large language model 133 may include and/or be based on a neural network using over a 100 billion parameters and/or weights. In some implementations, large language model 133 may be based on Generative Pre-trained Transformer 3 (GPT3). In some implementations, large language model 133 may be based on GPT3.5 or GPT4, as developed by OPENAI™. In some implementations, large language model 133 may be (derived from) Generative Pre-trained Transformer 3 (GPT3) or a successor of Generative Pre-trained Transformer 3 (GPT3). In some implementations, large language model 133 may be (derived from) Large Language Model Meta AI (LLAMA) by META™, or a successor. In some implementations, large language model 133 may be (derived from) PALM2™ by GOOGLE™, or a successor.

In some implementations, server 102, client computing platform(s) 104, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server 102, client computing platform(s) 104, and/or external resources 138 may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users 127 and system 100 and/or between users 127 and client computing platforms 104. For example, user interfaces 128 may provide an interface through which users may provide information to and/or receive information from system 100. In some implementations, user interface 128 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 138 may include sources of information outside of system 100, external entities participating with system 100, and/or other resources. In some implementations, external resources 138 may include a provider of electronic files, including but not limited to electronic files 123, from which system 100 and/or its components may obtain information. In some implementations, external resources 138 may include a provider of information and/or models, including but not limited to machine learning model (s) 134, and/or other information used by system 100 and/or its components. In some implementations, some or all of the functionality attributed herein to external resources 138 may be provided by resources included in system 100.

Server 102 may include electronic storage 130, one or more processors 132, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102. In some implementations, some or all of the functionality attributed herein to server 102 and/or system 100 may be provided by resources included in one or more client computing platform(s) 104.

Electronic storage 130 may comprise non-transitory storage media that electronically stores information. The electronic storage media of electronic storage 130 may include one or more of system storage that is provided integrally (i.e., substantially non-removable) with server 102, removable storage that is removably connectable or couplable to server 102 via, for example, a port (e.g., a USB port, a firewire port, etc.) or a drive (e.g., a disk drive, etc.), and/or local storage provided by one or more client computing platforms 104, external resources 138, and/or other components of system 100 or connected or coupled to system 100. Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server 102, information received from client computing platform(s) 104, and/or other information that enables server 102 to function as described herein.

Processor(s) 132 may be configured to provide information processing capabilities in server 102. As such, processor (s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, and/or 126, and/or other components. Processor(s) 132 may be configured to execute components 108, 110, 112, 114, 116, 118, 120, 122, 124, and/or 126, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, and/or 126 are illustrated in FIG. 1 as being implemented within a single processing unit, in implementations in which processor(s) 132 includes multiple processing units, one or more of components 108, 110, 112, 114, 116, 118, 120, 122, 124, and/or 126 may be implemented remotely from the other components. The description of the functionality provided by the different components 108, 110, 112, 114, 116, 118, 120, 122, 124, and/or 126 described below is for illustrative purposes, and is not intended to be limiting, as any of components 108, 110, 112, 114, 116, 118, 120, 122, 124, and/or 126 may provide more or less functionality than is described. For example, one or more of components 108, 110, 112, 114, 116, 118, 120, 122, 124, and/or 126 may be eliminated, and some or all of its functionality may be provided by other ones of components 108, 110, 112, 114, 116, 118, 120, 122, 124, and/or 126. As another example, processor(s) 132 may be configured to execute one or more additional components that may perform some or all of the functionality attributed below to one of components 108, 110, 112, 114, 116, 118, 120, 122, 124, and/or 126.

Figure 2A:
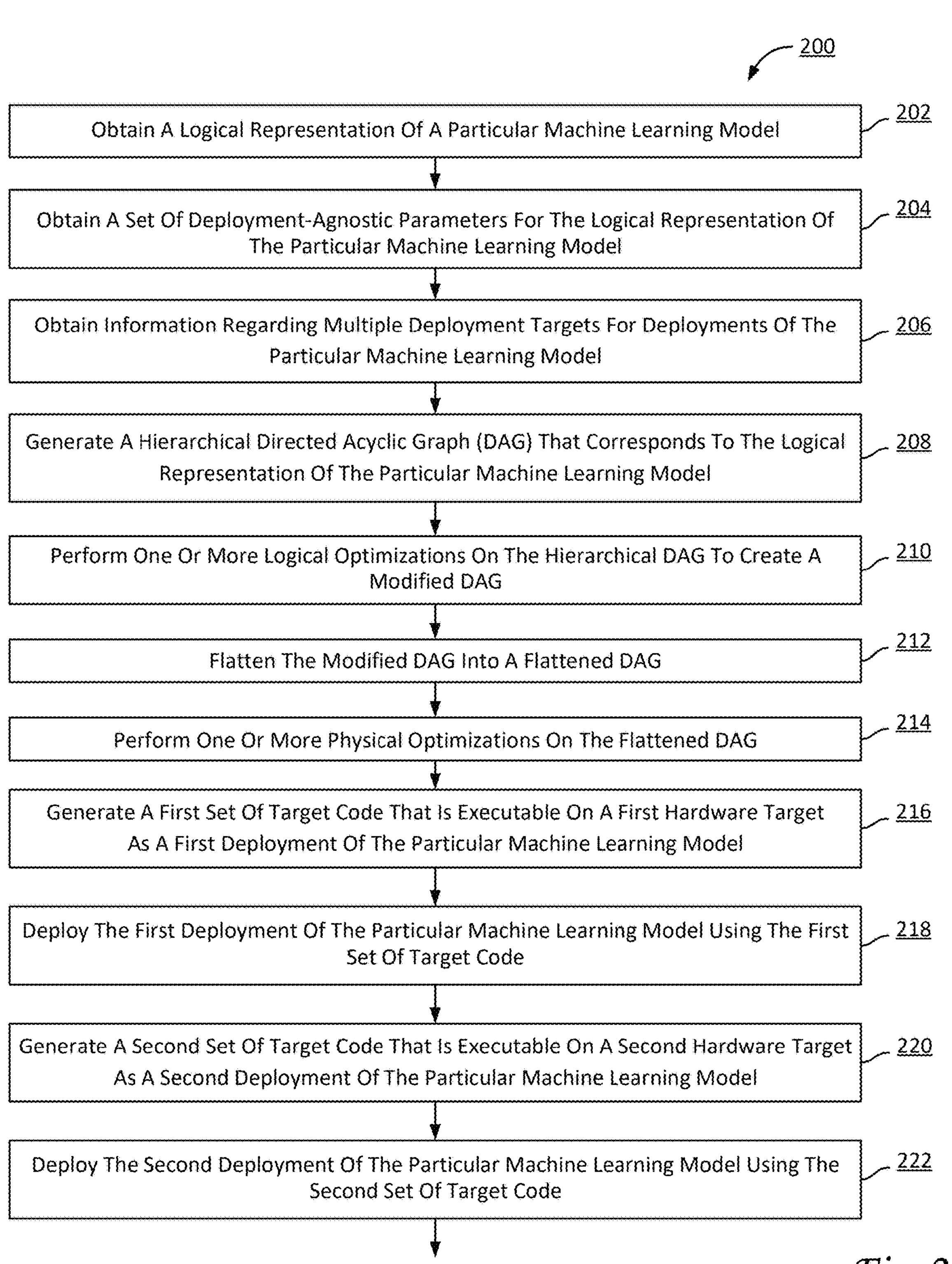
FIG. 2A and FIG. 2B illustrate a method of deploying individual machine learning models for multiple deployment targets (with the method starting in FIG. 2A and continuing in FIG. 2B), in accordance with one or more implementations.
Figure 2B:
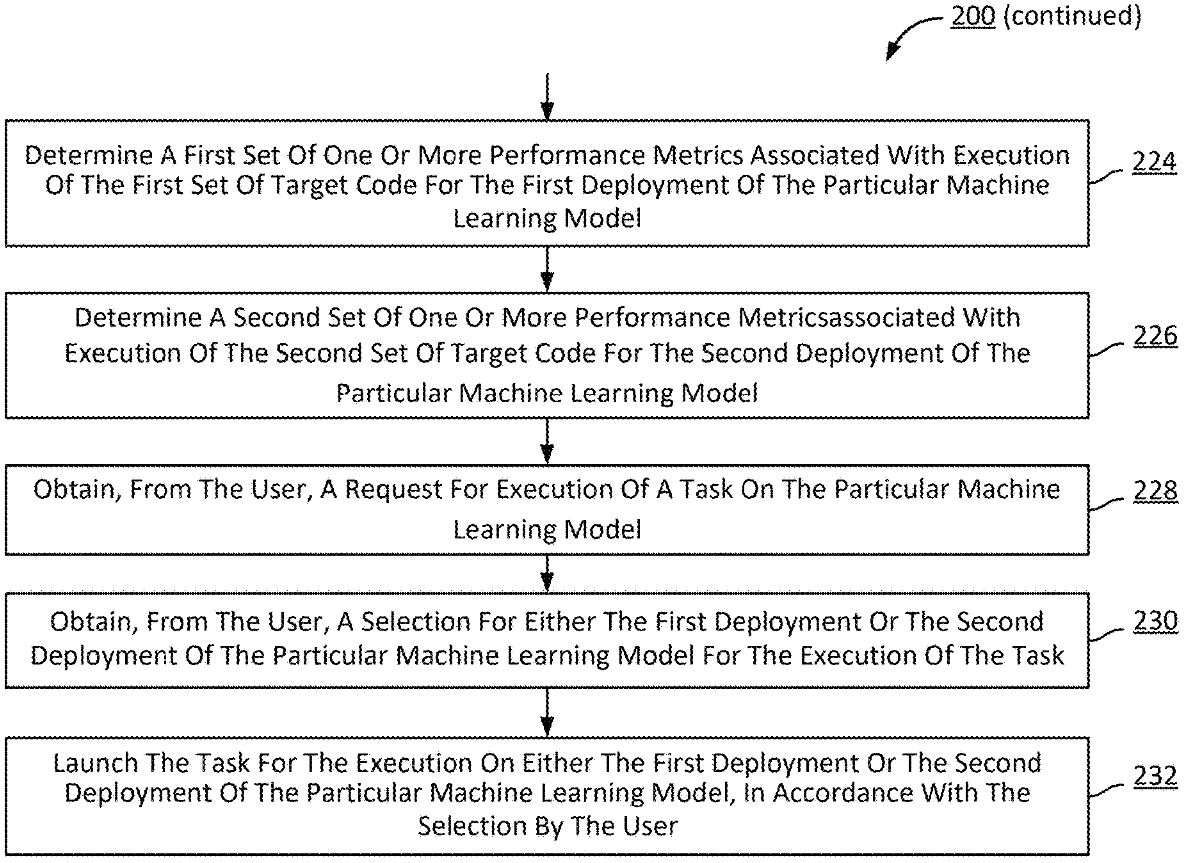

FIG. 2A and FIG. 2B illustrate a method 200 (starting in FIG. 2A and continuing in FIG. 2B) of deploying individual machine learning models for multiple deployment targets, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2A and FIG. 2B and described below is not intended to be limiting. In some implementations, at least some of the operations of method 200 may be performed in parallel.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a logical representation of a particular machine learning model is obtained. In some embodiments, operation 202 is performed by an acquisition component the same as or similar to acquisition component 108 (shown in FIG. 1 and described herein).

At an operation 204, a set of deployment-agnostic parameters is obtained for the logical representation of the particular machine learning model. In some embodiments, operation 204 is performed by an acquisition component the same as or similar to acquisition component 108 (shown in FIG. 1 and described herein).

At an operation 206, information is obtained, from a user, regarding multiple deployment targets for deployments of the particular machine learning model, including a first deployment target for a first deployment of the particular machine learning model and a second deployment target for a second deployment of the particular machine learning model. The information regarding the multiple deployment targets includes one or more of parallelization parameters and/or distribution parameters. In some embodiments, operation 206 is performed by a target component the same as or similar to target component 110 (shown in FIG. 1 and described herein).

At an operation 208, a hierarchical directed acyclic graph (DAG) is generated that corresponds to the logical representation of the particular machine learning model, based on the set of deployment-agnostic parameters and a mode of use for the deployments of the particular machine learning model. In some embodiments, operation 208 is performed by a graph component the same as or similar to graph component 112 (shown in FIG. 1 and described herein).

At an operation 210, one or more logical optimizations are performed on the hierarchical DAG to create a modified DAG. The one or more logical optimizations are agnostic with respect to the multiple deployment targets. In some embodiments, operation 210 is performed by a logical optimization component the same as or similar to logical optimization component 114 (shown in FIG. 1 and described herein).

At an operation 212, the modified DAG is flattened into a flattened DAG. In some embodiments, operation 212 is performed by a graph component the same as or similar to graph component 112 (shown in FIG. 1 and described herein).

At an operation 214, one or more physical optimizations are performed on the flattened DAG. The one or more physical optimizations are based on the multiple deployment targets for the deployments of the particular machine learning model. In some embodiments, operation 214 is performed by a physical optimization component the same as or similar to physical optimization component 116 (shown in FIG. 1 and described herein).

At an operation 216, a first set of target code is generated that is executable on a first hardware target as the first deployment of the particular machine learning model, based on the flattened DAG as optimized through the one or more logical optimizations and the one or more physical optimizations. In some embodiments, operation 216 is performed by a compilation component the same as or similar to compilation component 118 (shown in FIG. 1 and described herein).

At an operation 218, the first deployment of the particular machine learning model is deployed using the first set of target code. In some embodiments, operation 218 is performed by a deployment component the same as or similar to deployment component 120 (shown in FIG. 1 and described herein).

At an operation 220, a second set of target code is generated that is executable on a second hardware target as the second deployment of the particular machine learning model, based on the flattened DAG as optimized through the one or more logical optimizations and the one or more physical optimizations. In some embodiments, operation 220 is performed by a compilation component the same as or similar to compilation component 118 (shown in FIG. 1 and described herein).

At an operation 222, the second deployment of the particular machine learning model is deployed using the second set of target code. In some embodiments, operation 222 is performed by a deployment component the same as or similar to deployment component 120 (shown in FIG. 1 and described herein).

At an operation 224, a first set of one or more performance metrics is determined that is associated with execution of the first set of target code for the first deployment of the particular machine learning model. In some embodiments, operation 224 is performed by a performance component the same as or similar to performance component 122 (shown in FIG. 1 and described herein).

At an operation 226, a second set of one or more performance metrics is determined that is associated with execution of the second set of target code for the second deployment of the particular machine learning model. In some embodiments, operation 226 is performed by a performance component the same as or similar to performance component 122 (shown in FIG. 1 and described herein).

At an operation 228, a request is obtained, from the user, for execution of a task on the particular machine learning model. In some embodiments, operation 228 is performed by a launch component the same as or similar to launch component 126 (shown in FIG. 1 and described herein).

At an operation 230, a selection is obtained, from the user, for either the first deployment or the second deployment of the particular machine learning model for the execution of the task. In some embodiments, operation 230 is performed by a launch component the same as or similar to launch component 126 (shown in FIG. 1 and described herein).

At an operation 232, the task for the execution is launched on either the first deployment or the second deployment of the particular machine learning model, in accordance with the selection by the user. In some embodiments, operation 232 is performed by a launch component the same as or similar to launch component 126 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to deploy individual machine learning models for multiple deployment targets, the system comprising:

electronic storage configured to electronically store information; and one or more hardware processors configured by machine readable instructions to:

obtain a logical representation of a particular machine learning model;

obtain a set of deployment-agnostic parameters for the logical representation of the particular machine learning model;

obtain, from a user, a mode of use for deployments of the particular machine learning model, wherein the mode of use is selected from a set of modes that includes a training mode of use, a fine-tuning mode of use, and an inference mode of use;

obtain, from a user, information regarding multiple deployment targets for the deployments of the particular machine learning model, including a first deployment target for a first deployment of the particular machine learning model and a second deployment target for a second deployment of the particular machine learning model, wherein the information regarding the multiple deployment targets includes one or more of parallelization parameters and/or distribution parameters;

generate a hierarchical directed acyclic graph (DAG) that corresponds to the logical representation of the particular machine learning model, based on the set of deployment-agnostic parameters and the mode of use of the deployments;

perform one or more logical optimizations on the hierarchical DAG to create a modified DAG, wherein the one or more logical optimizations are agnostic with respect to the multiple deployment targets, and wherein the modified DAG is still functionally equivalent to the logical representation of the particular machine learning model;

flatten the modified DAG into a flattened DAG;

perform one or more physical optimizations on the flattened DAG, wherein the one or more physical optimizations are target-specific optimizations based on the information regarding the multiple deployment targets for the deployments of the particular machine learning model, and wherein the flattened DAG after the one or more physical optimizations is still functionally equivalent to the logical representation of the particular machine learning model;

generate a first set of target code that is executable on a first hardware target as the first deployment of the particular machine learning model, based on the flattened DAG as optimized through the one or more logical optimizations and the one or more physical optimizations;

deploy the first deployment of the particular machine learning model using the first set of target code;

generate a second set of target code that is executable on a second hardware target as the second deployment of the particular machine learning model, based on the flattened DAG as optimized through the one or more logical optimizations and the one or more physical optimizations;

deploy the second deployment of the particular machine learning model using the second set of target code, wherein the second deployment is functionally equivalent to the first deployment of the particular machine learning model;

determine a first set of one or more performance metrics associated with execution of the first set of target code for the first deployment of the particular machine learning model, wherein the first set of one or more performance metrics includes a first range of latencies associated with execution of the first set of target code for the first deployment of the particular machine learning model; and determine a second set of one or more performance metrics associated with execution of the second set of target code for the second deployment of the particular machine learning model, wherein the second set of one or more performance metrics includes a second range of latencies associated with execution of the second set of target code for the second deployment of the particular machine learning model.

2. The system of claim 1, wherein the one or more logical optimizations on the modified DAG include one or more of:

adjusting floating point precisions, pruning one or more computational paths in the modified DAG by virtue of unused inputs and/or unused operations, simplifying the modified DAG based on one or more ranges of one or more input values, and/or detecting one or more duplicate computations and reducing the modified DAG by removing the one or more duplicate computations.

3. The system of claim 1, wherein the one or more physical optimizations on the flattened DAG further include one or more universal optimizations that are agnostic with respect to the multiple deployment targets.

4. The system of claim 1, wherein the set of deployment-agnostic parameters is obtained through a file provided by the user, and wherein the file is stored in the electronic storage.

5. The system of claim 1, wherein the flattened DAG corresponds to a representation of the particular machine learning model that characterizes one or more data types, memory layout, and/or tensor shapes.

6. The system of claim 1, wherein generation of the first set of target code is based on one or more of minimizing peak memory usage, maximizing core utilization, and/or optimizing memory performance in accordance with the mode of use.

7. The system of claim 1, wherein the logical representation of the particular machine learning model is described in PYTHON™ via a domain-specific language (DSL), and stored in the electronic storage.

8. The system of claim 1, wherein the one or more hardware processors are further configured to:

determine one or more data structures that encode one or more dependencies of at least one of the hierarchical DAG, the modified DAG, and/or the flattened DAG, wherein at least one of the one or more logical optimizations and the one or more physical optimizations is based on using the one or more data structures.

9. The system of claim 1, wherein the parallelization parameters describe a number of physical computational devices available in at least one of the multiple deployment targets.

10. The system of claim 9, wherein optimizing the hierarchical DAG through the one or more logical optimizations and the one or more physical optimizations includes parallelizing computation across the number of physical computational devices based on tensor calculation times and inter-device communication latencies between the number of physical computational devices.

11. The system of claim 1, wherein the distribution parameters embody a strategy for sharding tensors across multiple devices and/or nodes.

12. The system of claim 1, wherein the one or more hardware processors are further configured to:

determine a first cost associated with the execution of the first set of target code for the first deployment of the particular machine learning model; and determine a second cost associated with execution of the second set of target code for the second deployment of the particular machine learning model.

13. The system of claim 1, wherein the second set of target code includes SystemVerilog code, and wherein the second deployment implements the SystemVerilog code on a field programmable gate array (FPGA) device or platform.

14. The system of claim 1, wherein the first deployment target and the second deployment target use different hardware architectures and different instruction set architectures.

15. The system of claim 1, wherein the first deployment target uses an architecture based on graphical processing units (GPUs) by NVIDIA™ and the second deployment target uses at least one of a tensor processing unit (TPU) architecture by GOOGLE™, a NeuronCore™ architecture by AWS™, an XDNA™ architecture or an CDNA™ architecture by AMD™, a neural processing unit (NPU) architecture by INTEL™, and/or an AZURE AI architecture by MICROSOFT™.

16. The system of claim 1, wherein the multiple deployment targets include a third deployment target for a third deployment of the particular machine learning model, and wherein the one or more hardware processors are further configured to:

generate a third set of target code that is executable as the third deployment of the particular machine learning model, based on the flattened DAG as optimized through the one or more logical optimizations and the one or more physical optimizations;

deploy the third deployment of the particular machine learning model using the third set of target code; and determine a third set of one or more performance metrics associated with execution of the third set of target code for the third deployment of the particular machine learning model.

17. The system of claim 1, wherein the one or more hardware processors are further configured to:

obtain, from the user, a request for execution of a task on the particular machine learning model;

obtain, from the user, a selection for either the first deployment or the second deployment of the particular machine learning model for the execution of the task; and launch the task for the execution on either the first deployment or the second deployment of the particular machine learning model, in accordance with the selection by the user.

18. A method of deploying individual machine learning models for multiple deployment targets, the method comprising:

obtaining a logical representation of a particular machine learning model;

obtaining a set of deployment-agnostic parameters for the logical representation of the particular machine learning model;

obtaining, from a user, information regarding multiple deployment targets for deployments of the particular machine learning model, including a first deployment target for a first deployment of the particular machine learning model and a second deployment target for a second deployment of the particular machine learning model, wherein the information regarding the multiple deployment targets includes one or more of parallelization parameters and/or distribution parameters;

generating a hierarchical directed acyclic graph (DAG) that corresponds to the logical representation of the particular machine learning model, based on the set of deployment-agnostic parameters and a mode of use for the deployments of the particular machine learning model;

performing one or more logical optimizations on the hierarchical DAG to create a modified DAG, wherein the one or more logical optimizations are agnostic with respect to the multiple deployment targets, and wherein the modified DAG is still functionally equivalent to the logical representation of the particular machine learning model;

flattening the modified DAG into a flattened DAG;

performing one or more physical optimizations on the flattened DAG, wherein the one or more physical optimizations are target-specific optimizations based on the information regarding the multiple deployment targets for the deployments of the particular machine learning model, and wherein the flattened DAG after the one or more physical optimizations is still functionally equivalent to the logical representation of the particular machine learning model;

generating a first set of target code that is executable on a first hardware target as the first deployment of the particular machine learning model, based on the flattened DAG as optimized through the one or more logical optimizations and the one or more physical optimizations;

deploying the first deployment of the particular machine learning model using the first set of target code;

generating a second set of target code that is executable on a second hardware target as the second deployment of the particular machine learning model, based on the flattened DAG as optimized through the one or more logical optimizations and the one or more physical optimizations;

deploying the second deployment of the particular machine learning model using the second set of target code, wherein the second deployment is functionally equivalent to the first deployment of the particular machine learning model;

determining a first set of one or more performance metrics associated with execution of the first set of target code for the first deployment of the particular machine learning model, wherein the first set of one or more performance metrics includes a first range of latencies associated with execution of the first set of target code for the first deployment of the particular machine learning model; and determining a second set of one or more performance metrics associated with execution of the second set of target code for the second deployment of the particular machine learning model, wherein the second set of one or more performance metrics includes a second range of latencies associated with execution of the second set of target code for the second deployment of the particular machine learning model.

19. The method of claim 18, further comprising:

obtaining, from the user, a request for execution of a task on the particular machine learning model;

obtaining, from the user, a selection for either the first deployment or the second deployment of the particular machine learning model for the execution of the task; and launching the task for the execution on either the first deployment or the second deployment of the particular machine learning model, in accordance with the selection by the user.

* * * * *